(12) United States Patent
Nabeiro

(10) Patent No.: US 11,154,084 B2
(45) Date of Patent: Oct. 26, 2021

(54) EDIBLE COATING, SYSTEM OF EDIBLE PRODUCTS PRESENTING SAID EDIBLE COATING AND USE OF SAID SYSTEM

(71) Applicant: NOVADELTA—COMÉRCIO E INDÚSTRIA DE CAFÉS S.A., Lisbon (PT)

(72) Inventor: Rui Miguel Nabeiro, Campo Maior (PT)

(73) Assignee: NOVADELTA - COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 291 days.

(21) Appl. No.: 15/775,513

(22) PCT Filed: Nov. 25, 2016

(86) PCT No.: PCT/PT2016/050025
§ 371 (c)(1),
(2) Date: May 11, 2018

(87) PCT Pub. No.: WO2017/091094
PCT Pub. Date: Jun. 1, 2017

(65) Prior Publication Data
US 2018/0317539 A1 Nov. 8, 2018

(30) Foreign Application Priority Data
Nov. 27, 2015 (PT) .......................................... 108986

(51) Int. Cl.
| | |
|---|---|
| *A23P 20/10* | (2016.01) |
| *C09D 105/00* | (2006.01) |
| *A23F 5/14* | (2006.01) |
| *A23L 29/206* | (2016.01) |
| *B65D 65/46* | (2006.01) |

(52) U.S. Cl.
CPC .............. *A23P 20/105* (2016.08); *A23F 5/14* (2013.01); *A23L 29/206* (2016.08); *B65D 65/463* (2013.01); *C09D 105/00* (2013.01); *A23V 2002/00* (2013.01)

(58) Field of Classification Search
CPC ........ A23P 20/00; A23P 20/10; A23L 29/206; C09D 105/00; A23F 5/14; A23F 5/00; A23V 2250/03
USPC ........................................................ 426/103
See application file for complete search history.

(56) References Cited

U.S. PATENT DOCUMENTS

| | | | |
|---|---|---|---|
| 2,665,992 A | 1/1954 | Naps | |
| 2005/0255202 A1* | 11/2005 | Dalziel | ...................... A23F 5/14 |
| | | | 426/302 |
| 2007/0248731 A1* | 10/2007 | Curti | .......................... A23F 5/46 |
| | | | 426/533 |
| 2009/0317521 A1* | 12/2009 | Campanile | ................ A23L 2/56 |
| | | | 426/93 |

FOREIGN PATENT DOCUMENTS

| | | |
|---|---|---|
| CH | 483 799 A | 1/1970 |
| WO | 2008/075945 A1 | 6/2008 |
| WO | 2013/113027 A2 | 8/2013 |

OTHER PUBLICATIONS

Esquivel et al. "Functional properties of coffee and coffee by-products", Food Research International vol. 46, Issue 2, May 2012, pp. 488-495. (Year: 2012).*
Michael Hession; https://gizmodo.com/espresso-101-the-methods-and-machines-behind-the-perfe-484457706 (Year: 2013).*
International Search Report for PCT/PT2016/050025 dated Mar. 22, 2017 [PCT/ISA/210].

* cited by examiner

*Primary Examiner* — Jyoti Chawla
(74) *Attorney, Agent, or Firm* — Sughrue Mion, PLLC

(57) ABSTRACT

The present invention discloses an edible coating (1) adapted for providing at least one of a passive and active function, as well as edible products (2) presenting a portion of edible substance (3) and said edible coating (1) adapted for providing at least one of a passive and active function to said portion of edible substance (2).
The present invention further discloses a system of edible products (2) presenting said edible coating (1), as well as use of said system of edible products (2).

10 Claims, 3 Drawing Sheets

EDIBLE COATING, SYSTEM OF EDIBLE PRODUCTS PRESENTING SAID EDIBLE COATING AND USE OF SAID SYSTEM

CROSS REFERENCE TO RELATED APPLICATIONS

This application is a National Stage of International Application No. PCT/PT2016/050025 filed Nov. 25, 2016, claiming priority based on Portuguese Patent Application No. 108986 filed Nov. 27, 2015.

FIELD OF THE INVENTION

The present invention refers to the field of edible coatings, of systems of edible products and uses thereof, in particular to the field of beverage preparation, such as for example coffee and other aromatic beverages, presenting edible coatings.

BACKGROUND OF THE INVENTION

The prior art presents several solutions of edible coatings.

Coffee constitutes an edible product that presents a significant number and diversity of organoleptic properties resulting from a particularly complex matrix of multiple chemical substances, present in bigger or smaller content according to different factors, such as for example composition (blend), type of processing and other. Some of these chemical substances present valuable benefits in different types of applications such as the case of the classes of compounds to be used in the synthesis of edible coatings.

Moreover, coffee is an edible products that can be provided in different forms, including roasted ground coffee, available in the form of loose granulate and of compacted pod and used for example in the preparation of espresso type coffee, soluble coffee in the form of soluble granulate, coffee concentrate in the liquid form, and other.

In general, the systems of distribution of coffee require packages, such as for example rigid capsules or flexible pods of single portions, that provide an effective water, humidity and oxygen barrier, so as to ensure the protection/maintenance of proprieties, aromas and tastes associated with several of said chemical substances, in particular volatile compounds. However, the use of standard package materials, such as for example synthetic materials and aluminium, is associated with multiple economic, environmental costs and, even, quality constrains of the edible product.

Documents WO 2011/123949 and WO 2013/049928 A1 disclose edible coatings for preserving an organoleptic propriety of a food product and that includes a polysaccharide, in particular a polysaccharide selected from the group that comprises carrageenates, gelane, sodium alginate and pectin, and a solution of reticulating agent.

Document WO 2015/097335 A1 discloses an edible coating for the conservation of pieces of fruit and that includes a first polysaccharide aqueous solution and a second aqueous solution that includes a crossing of a calcium agent for the jellification of the polysaccharide in the first aqueous solution.

Document US 2008317931 A1 discloses a capsule for preparation of beverages including two compartments, whereby the wall of a compartment contains a water soluble material, in particular said wall contains a sucrose syrup, glucose syrup, other polysaccharides or mixtures thereof.

Document US 2010303969 A1 discloses dissoluble films impregnated with tobacco, tea, coffee, botanic and tastes for oral products. Said film comprises combining finely divided particles of vegetable material with a first coating material in a liquid medium, mixing a second coating material, inducing the formation of a gel matrix and forming a film from said gel matrix.

Document US 2013056551 A1 discloses an aroma encapsulated so that can be released, in particular gelatine capsules that encapsulate at least one aromatic compound. The gelatine capsules comprise complex coacervate agents formed by gelatine formed by gelatine and anionic hydrocoloid polymer.

The document "Galactomannans use in the development of edible films/coatings for food applications", M. A. Cerqueira et al., Trends in Food Science & Technology 22 (2011) 662-671, does not disclose the use of certain coffee derivate, in particular of at least one polysaccharide extractable from coffee in the composition of an edible coating.

None of the documents in prior art discloses an edible coating that provides an effective oxygen barrier for maintaining the main chemical and sensorial properties associated with coffee, and that in general provides affinity with coffee, and, moreover, that provides a reinforcement of certain chemical proprieties associated with coffee or with substances derived therefrom.

GENERAL DESCRIPTION OF THE INVENTION

The objective of the present invention is to provide an edible coating that provides effective maintenance of the constituting and organoleptic characteristics of an edible substance, in particular a barrier to fluids including water, water vapour and oxygen, such as for example a single portion of an edible substance.

This objective is attained according to the present invention by means of an edible coating according to claim 1.

Another objective of the present invention is to provide a system of edible products including an edible coating that substantially reduces the construction complexity, as well as the use of materials and respective residues, in particular coffee grounds, associated with the package of an edible substance.

This objective is attained according to the present invention by means of a system of edible products, comprising at least one portion of edible substance and at least one edible coating.

According to a preferred embodiment, said edible portion is a dose of at least one type of coffee including roasted ground coffee, micronized roasted coffee, soluble coffee and coffee concentrate. According to another preferred embodiment, said edible portion is a dose of a substance precursor of a beverage, such as for example milk, tea, or of another type of edible product.

Another objective of the present invention is to provide a use of said system of edible products.

DESCRIPTION OF THE FIGURES

The invention shall now be explained in greater detail based upon the preferred embodiments and in the attached Figures.

The Figures show, in simplified schematic representations.

DETAILED DESCRIPTION OF PREFERRED EMBODIMENTS OF THE INVENTION

Figure 1:
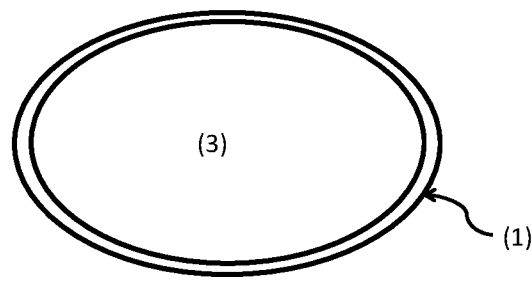
FIG. 1: side cut view along a cross-section plane of a first embodiment of a system for distribution of edible products according to the present invention.

FIG. 1 schematically represents a first embodiment of a system for distribution of edible products including an edible coating (1) according to the present invention. For merely illustrative purposes and without constrain of the scope of the present invention, said system can include edible products comprising edible portions for the preparation of aromatic beverages, such as for example espresso type coffee, tea, cereals based beverages, including refrigerants and similar. Moreover, said edible portion (3) can be for example of roasted ground coffee, and the edible product (2) can be adapted so that can be used in a beverage preparation machine.

In the case of this embodiment, said edible product (2) comprises an edible portion (3) provided as a nucleus, in this case in a generally oval form, and an edible coating (1) provided as an envelope upon the entire exterior surface of said edible portion (3).

According to a first inventive aspect, said edible coating (1) includes at least one polysaccharide extractable from coffee or from a coffee derivate.

According to a preferred embodiment, said edible coating (1) is adapted so that provides at least one of a passive function, including structural stability and oxygen and water vapour barrier, and of an active function, including additive substances, notably with particularly recognized health benefits, colouring substances and taste and aroma substances, or other, thereby providing physic-chemical characteristics that are meant to be reinforced or added to said edible product (2).

According to a particularly preferred embodiment, said edible coating (1) includes at least one polysaccharide selected from the group of polysaccharides constituting an espresso type coffee beverage, including materials of at least one of high and low molecular weight, linked or not to dietetic fibre of espresso type coffee beverage or to melanoidins and that can be structures of galactomannans and arabinogalactans.

Said edible coating (1) is in this case configured as an envelope presenting a wall thickness of less than 5 mm, preferentially of less than 3 mm, so that provides an oxygen and water vapour barrier, so as to thereby protect the organoleptic proprieties of the edible portion (3) disposed inside thereof.

Figure 2:
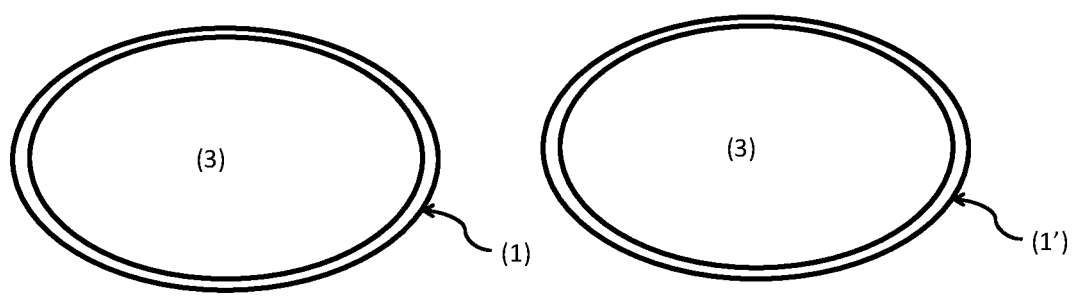
FIG. 2: side cut view along a cross-section plane of a second embodiment of a system for distribution of edible products according to the present invention.

FIG. 2 represents views that are similar to those of FIG. 1, of two types of edible products (2, 2') included in a system of edible products according to the present invention.

In the case of the represented embodiment, said types of edible products (2, 2'), for example different blends of roasted and ground coffee, or different types of soluble coffee, present a similar form and volume, but differ in the composition of a respective edible coating (1, 1'). For example, in a first case the edible portion (3) is a previously compacted pod of roasted and ground coffee beans, and on a second case the edible portion (3') is soluble coffee powder.

In particular, respective edible coatings (1, 1') can be adapted so as to provide at least one of different passive and active functions. For example, it could be advantageous to configure said edible coating (1) so that it can dissolve when impinged by a fluid flow presenting a given value of flow pressure.

Moreover, it can be advantageous to adapt said edible coating (1) so that it carries different additive substances, for example according to the type of substance of the edible portion (3) in a respective type of edible product (2, 2').

According to a preferred embodiment of the present invention, said system of edible products is used in machines for preparing edible products, such as for example in a machine for preparing espresso type coffee or soluble coffee, whereby said edible coating (1) is in this case preferentially soluble in a flow presenting a flow pressure bigger than 2 bar and smaller than 16 bar, and a flow temperature bigger than 40° C., preferentially bigger than 60° C., particularly preferentially between 80 and 92° C.

According to another preferred embodiment of the present invention, said system of edible products is used for dissolving in a fluid, such as for example in water, and for dispersion by means of agitation in a fluid, in particular for direct ingestion by consumers.

Figure 3:
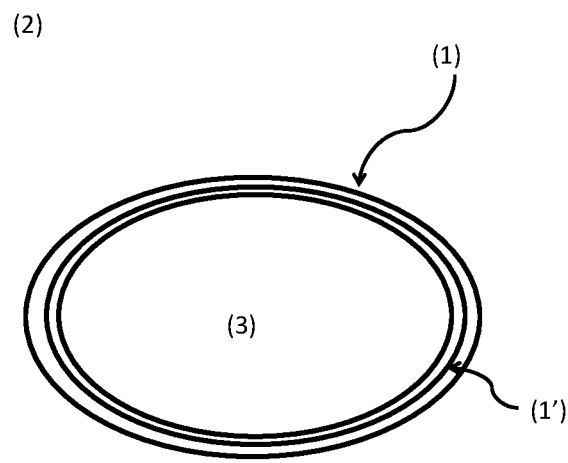
FIG. 3: side cut view along a cross-section plane of a third embodiment of a system for distribution of edible products according to the present invention.

FIG. 3 another embodiment of an edible product (2) in a system of edible products according to the invention.

In particular, said edible products (2) in this case comprises an edible portion (3) confined by an envelope that presents two adjacent layers of edible coatings (1, 1') of different compositions, whereby at least one thereof is provided as a wall-like disposition that provides an oxygen and water vapour barrier.

According to a preferred embodiment of the present invention, said system of edible products is used directly in a recipient for preparing edible products, such as for example in a glass or bottle, whereby said edible coating (1) is in this case preferentially soluble in a flow presenting a flow pressure similar to the atmospheric pressure.

Figure 4:
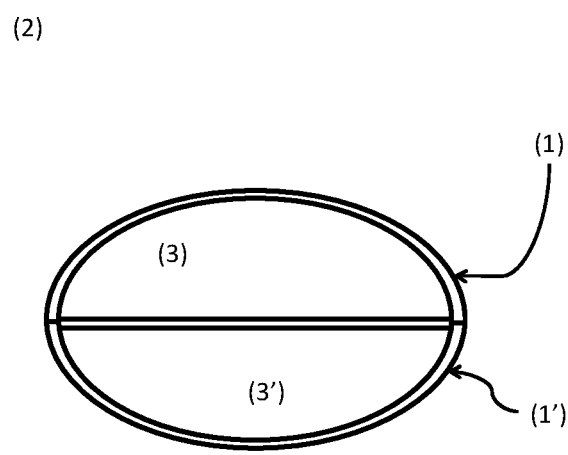
FIG. 4: side cut view along a cross-section plane of a fourth embodiment of a system for distribution of edible products according to the present invention.

FIG. 4 represents another embodiment whereby an edible product (2) presents two edible portions (3, 3') provided adjacent, optionally of similar substances and different physical characteristics, such as for example roasted ground coffee presenting a different average dimension, or a different statistical distribution of average dimension, or a different degree of compaction, whereby each one of said edible portions (3, 3') presents a respective edible coating (1, 1') on the exterior surface thereof. Said edible coatings (1, 1') are provided different in at least one of a respective composition parameter, of a physical structure parameter and of a dimensional parameter.

Said edible portions (3, 3') can for example be of different blends of roasted ground coffee, or of roasted ground coffee and powder milk.

Figure 5:
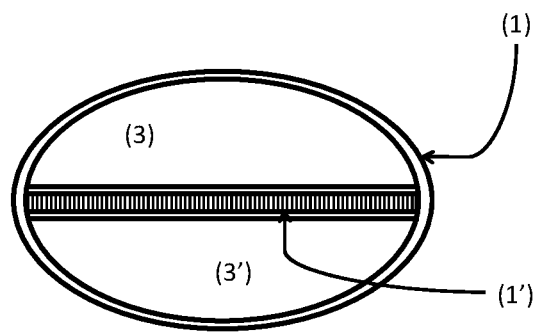
FIG. 5: side cut view along a cross-section plane of a fifth embodiment of a system for distribution of edible products according to the present invention.

The embodiment represented in FIG. 5 likewise presents two different edible coatings (1, 1'), whereby in this case each one develops over a different portion of exterior envelope of two edible portions (3, 3'), provided adjacent and as part of an edible product (2).

In the case of this embodiment, a first edible coating (1) is provided over the whole exterior envelope, whereas a second edible coating (1') is provided over the part of the surface that is between said portions of edible substance. According to a preferred embodiment, said first edible coating (1) provides passive functions of the type oxygen and water vapour barrier, whereas said second edible coating (1') —represented in shadow—is adapted as a mesh-like disposition, so that initially provides flow passageways when impinged by an upstream fluid flow presenting a flow temperature that is higher than ambient temperature.

Figure 6:
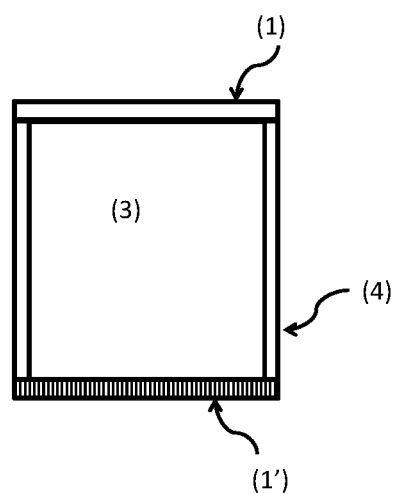
FIG. 6: side cut view along a cross-section plane of a sixth embodiment of a system for distribution of edible products according to the present invention.

FIG. 6 shows another preferred embodiment of an edible product (2) in a system of edible products according to the present invention.

Said edible product in this case comprises an edible portion (3), for example of coffee concentrate, including in the liquid form and in the powder form, confined in two opposing tops by respective parts of an edible coating (1, 1'), provided as different compositions and/or as elements of different physical structure or dimensions, and by a non-edible construction disposition (4), in this case provided for example as a side wall of cylindrical shape, for example in a synthetic material or in a woven or non-woven material, preferentially biodegradable.

According to a preferred embodiment of the present invention, said system of edible products is used in a machine for preparing edible products, such as for example beverage preparation machines, by means of extraction or infusion.

The invention claimed is:

1. An edible coating (1), for covering an exterior surface of an edible product (2) that comprises at least one edible portion (3) disposed within said edible product (2), consisting of:
    at least one polysaccharide, and
    at least one from the group consisting of lipids, waxes, plasticizing agents and surfactant agents,
    wherein said at least one polysaccharide is an extract from a derivate substance selected from the group consisting of an espresso-type coffee based concentrate and residues resulting from espresso-type processing of coffee, and
    wherein said coating provides at least one of passive and active properties.

2. The edible coating (1) according to claim 1, wherein said passive property comprises at least a passive function from the group including structural stability and a fluid barrier to at least one of volatile organic compounds, oxygen, and water vapor, and
    wherein said active property comprises at least an active function from the group including taste, aroma, coloring and health benefits.

3. The edible coating (1) according to claim 1,
    wherein said at least one polysaccharide includes galactomannans and arabinogalactans, and
    wherein said edible coating further includes chlorogenic acids extractable from an espresso coffee derivate, and
    wherein said edible coating further includes sugars extractable from a coffee derivate, comprising galactose, mannose, arabinose, rhamnose and glucose.

4. The edible coating (1) according to claim 1, wherein said at least one polysaccharide comprises a content of polysaccharide material of up to 600 mg per 40 ml of espresso type coffee beverage.

5. The edible coating (1) according to claim 1, wherein said waxes include bee wax, said plasticizing agents include, glycerol, and said surfactant agents include lecithin.

6. The edible coating (1) according to claim 1, wherein said coating is dissolvable when impinged by a fluid flow presenting at least one of:
    a flow pressure of at least 2 bar and smaller than 16 bar, and
    a flow temperature higher than 40° C. and lower than 92° C.

7. The edible coating (1) according to claim 1, wherein said coating is a continuous element having a mesh-like structure and being disposable over at least part of the exterior surface of the edible product (2) that is precursor of a coffee beverage.

8. The edible coating (1) according to claim 3, wherein said at least one polysaccharide is extractable from coffee grounds resulting from extraction of an espresso type coffee beverage.

9. The edible coating (1) according to claim 6, wherein said coating dissolves when impinged by a fluid flow presenting at least one of:
    a flow pressure of at least 5 bar and lower than 16 bar, and
    a flow temperature higher than 80° C. and lower than 92° C.

10. The edible coating (1) according to claim 7, wherein said coating is a derivate of an espresso-type coffee made from plural varieties of roasted ground coffee beans.

* * * * *